United States Patent [19]

Deschuytere

[11] Patent Number: 5,602,971
[45] Date of Patent: Feb. 11, 1997

[54] MULTILEVEL HALFTONING USING A RANDOMISED BAYER MATRIX

[75] Inventor: Frank Deschuytere, Beveren, Belgium

[73] Assignee: Agfa-Gevaert, NV, Belgium

[21] Appl. No.: 437,003

[22] Filed: May 8, 1995

[30] Foreign Application Priority Data

May 11, 1994 [EP] European Pat. Off. ............. 94201330

[51] Int. Cl.$^6$ ............. H04N 1/405; G06K 15/02
[52] U.S. Cl. ............. 395/109; 358/454; 358/456; 358/458; 358/298
[58] Field of Search ............. 395/109; 358/298, 358/454, 456, 457, 458; 347/131, 183, 184, 253, 254, 251

[56] References Cited

U.S. PATENT DOCUMENTS

| | | | |
|---|---|---|---|
| 4,724,446 | 2/1988 | Hirahara et al. | 358/298 |
| 4,736,254 | 4/1988 | Kotera et al. | 358/457 |
| 4,814,886 | 3/1989 | Kuge et al.1 | 358/457 |
| 4,884,080 | 11/1989 | Hirahara et al. | 358/298 |
| 4,910,603 | 3/1990 | Hirahara et al. | 358/298 |
| 5,099,259 | 3/1992 | Hirahara et al. | 358/298 |

*Primary Examiner*—Scott A. Rogers
*Attorney, Agent, or Firm*—John A. Merecki

[57] ABSTRACT

A reproduction method for continuous tone images on an output device having multilevel capabilities is described. The microdots addressable by the output device are arranged into identical tiles. The microdots in a tile get a sequence number, according to a randomised Bayer pattern for which the runlengths of microdots having low sequence numbers are reduced. The sequence is divided into five subsequences. The microdots belonging to the first three subsequences are changed exclusively to higher density levels for decreasing intensity levels, each within a specific intensity range of the input image. The microdots belonging to the last two subsequences are used to more continuously reproduce the image levels. Equivalent microdots within a tile are further differentiated by a second sequence numbering, in order to ensure smooth and precise average density transitions in reproduced continuous tones.

7 Claims, 7 Drawing Sheets

Penalty

|  |  |
|---|---|
| 0  16  4  20<br>24  8  28  12<br>6  22  2  18<br>30  14  26  10 | 1  17  5  21<br>25  9  29  13<br>7  23  3  19<br>31  15  27  11 |
| 1  17  5  21<br>25  9  29  13<br>7  23  3  19<br>31  15  27  11 | 0  16  4  20<br>24  8  28  12<br>6  22  2  18<br>30  14  26  10 |

*FIG. 6*

MULTILEVEL HALFTONING USING A RANDOMISED BAYER MATRIX

BACKGROUND OF THE INVENTION

1. Field of the Invention

The present invention relates to a system capable of rendering more than two density levels at each addressable position on a carrier. The methods of the current invention are especially useful for electrographic printing of continuous tone image by multilevel halftoning.

2. Description of the Prior Art

Most image, text and graphics reproduction systems have the ability to produce continuous density variations or just binary density levels. Photographic black and white prints can produce at every location an almost continuous range of grey levels, ranging from white to black. Photographic colour prints can have at every location a full scala of densities for the different colour components. Offset printers used in the graphic industry on the other hand can render only two density levels of one ink for every location, making it a binary system. At each location, the highest density is printed by full ink coverage or the lowest density is rendered by absence of ink. The illusion of continuous tone must be obtained by screening, as known in the art.

Figure 3:
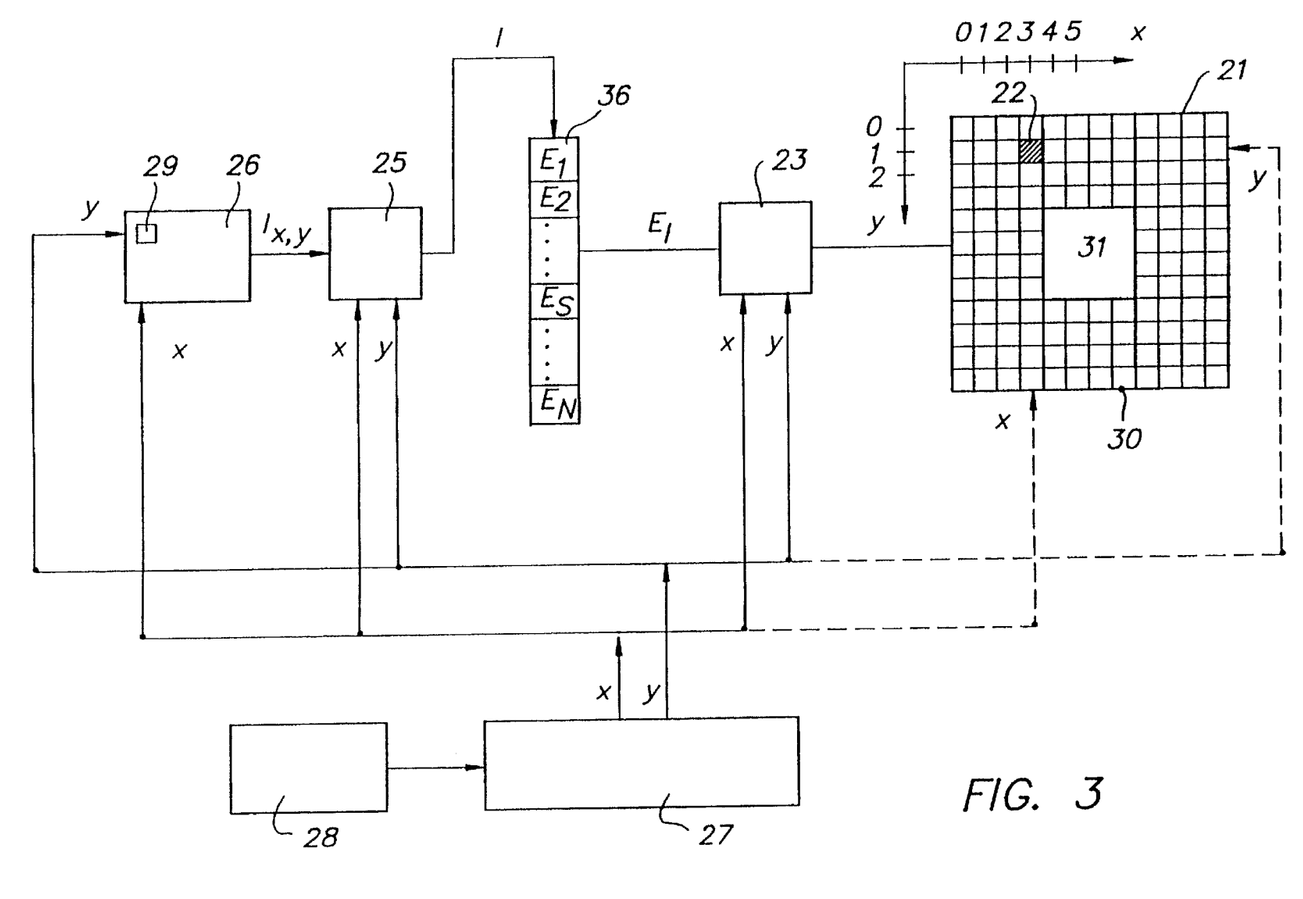
FIG. 3 is a schematic representation of a system for carrying out the current invention.
Figure 5:
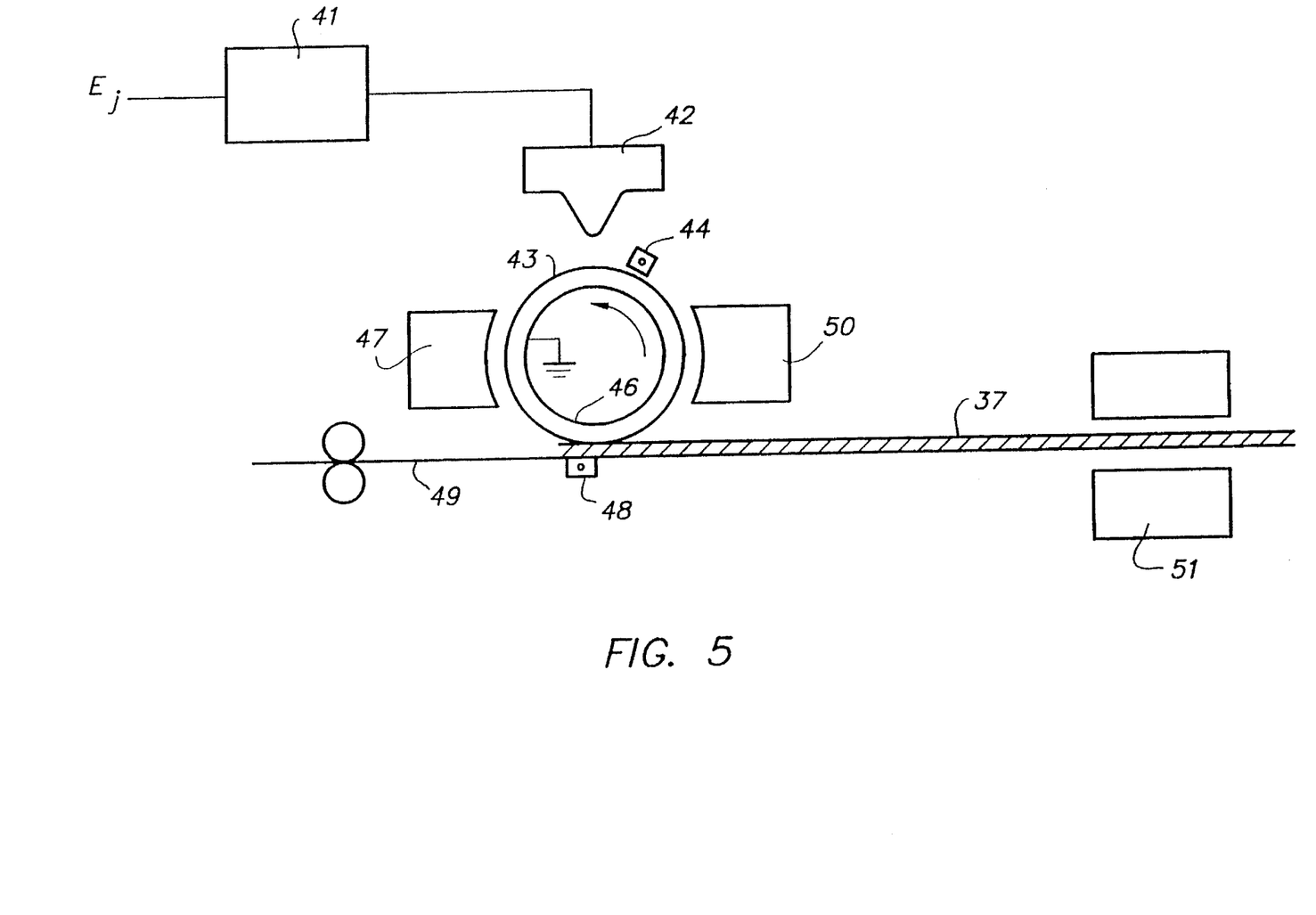
FIG. 5 is a printing engine suitable for carrying out the method according to the current invention.

Recently, rendering systems became available that can modulate the density of every location in more than two levels, where this was not possible before. An example for this is an electrographic printer as shown in FIG. 5. In such a system, a latent electrostatic image is first formed on a semiconductor drum 43. The latent image is developed by the application of toner particles 47 that get attracted to or repelled from the drum 43 depending on the local electrostatic load. The toner particles 47 attracted to the drum 43 are then offset on the carrier 37 and fused by pressure and heat onto the carrier 37. This way, the latent image from the drum 43 becomes visible by the density caused by the fused toner particles. For a long time it has been possible in a controlled way to deposit at every location of the semiconductor drum 43 a large amount of toner particles, enough to locally fully cover the carrier 37 or to deposit nothing. In that sense, the electrographic systems were purely binary. This was ideal for rendering text and graphics. The rendering of continuous images could be done by halftoning, as known for offset printing, but with lower spatial and density resolution than offset printing. The local electrostatic load and the deposit of toner particles on the drum can now be controlled more accurately, such that the amount of toner particles at each location on the carrier is more variable. When toner particles on the carrier locally do not cover the carrier 37 completely, grey shades can be obtained. In an electrophotographic printer—a special case of an electrographic printer—the electrostatic load is modulated by a light beam 42. The semiconductor drum 43 is photosensitive and depending on the total light energy impinged on a specific location of the drum 43, the electrostatic load leaks away to ground. By modulation 41 of the light energy, different grey tones or colour tones can be obtained by such a system. Usually, the light energy is applied to individually addressable spots, called microdots 22 as shown in FIG. 3. A system having this capabilities is the Chromapress. This system is marketed by Agfa-Gevaert N. V. from Mortsel Belgium. It is a duplex colour printer (cyan, magenta, yellow, black) having a resolution of 600 microdots per inch producing 1000 A3 pages per hour. Per microdot, 64 different energy levels for the impinged light energy can be selected.

It has been found however that these energy levels do not all produce consistently the same density on the carrier 22 in FIG. 3. For energy levels corresponding with high densities on the carrier, which we will further call high energy levels, there is a predictable relation between energy level and density level on the carrier. For lower energy levels applied to a first microdot, the density level of the first microdot on the carrier strongly depends on the energy level applied to the microdots in the neighbourhood of the first microdot. Therefore, in the example of the Chromapress system, it is not recommended to freely use all 64 available energy levels independent from the energy levels in the neighbourhood. This is referred to as the density level stability.

Moreover, when continuous tone images are presented digitally, mostly 256 different intensity levels are offered. If these 256 intensity levels were mapped directly to the 64 available energy levels, then only 64 density levels would appear on the carrier. Different studies have pointed out that such a poor density resolution results in visually perceptible density steps and contouring. Several attempts have been made—based on classical clustered dot halftoning techniques—to improve the density resolution by screening the intensity levels of the input image signals. But screening reduces the spatial resolution of the system. If for the Chromapress system a screen is used with halftone cells consisting of 6×6 microdots, the screen ruling is reduced to 100 lpi (lines per inch) because the basic system has a resolution restricted to 600 dpi (dot per inch). Moreover, most screening techniques known in the art can introduce several types of moire. The first type is auto moire, caused by the interference of the screening pattern with the recorder grid composed of microdots. A second type is subject moire, caused by patterns in the input image that interfere with the screening pattern. A third type is moire caused by overlaying different colour components of a colour image. Each colour component is a halftone image, with a specific screening pattern. When in multi colour reproductions three (cyan, magenta and yellow) or four (including black) single colour halftone images, each having a specific pattern, are superimposed on each other, the specific patterns can interfere with each other and give disturbing moire patterns. In EP 0 240 202 A1 a method is described to distribute energy levels over microdots of small repetitive halftone cells. Due to the equal spacing between energy-concentrated dots, low frequency patterns may appear in the reproduction. There is a need to avoid such disturbing effects.

OBJECTS OF THE INVENTION

It is a first object of the invention to improve the density level stability of a multilevel density rendering system.

It is a second object of the invention to improve the density resolution of a multilevel density rendering system.

It is a third object of the invention to improve the spatial resolution of a multilevel density rendering system for a required minimal density resolution.

It is a fourth object of the invention to reduce or eliminate the presence of any type of moire.

SUMMARY OF THE INVENTION

Figure 4:
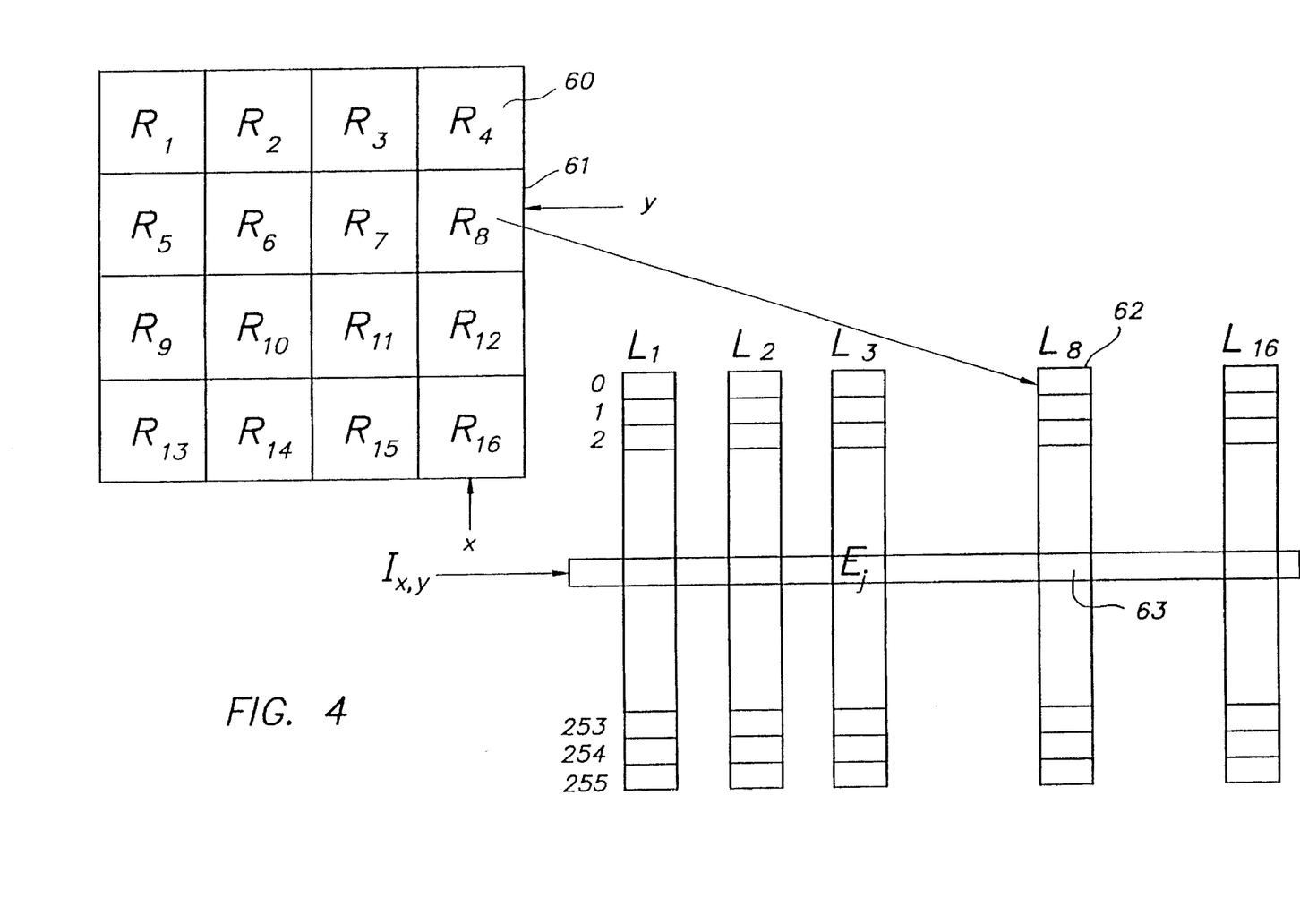
FIG. 4 is a schematic view of a tile 61, a microdot 60 and an associated pixel tone curve 62.

Referring to FIG. 3 in accordance with the present invention, a method is disclosed for the reproduction on a carrier (21) by a rendering system (23) of a continuous tone image 26 represented by intensity levels, whereby the rendering system 23 generates a density change on a microdot (22) on the carrier (21) in response of an energy level $E_j$, $E_l$ causing the lowest density level on the carrier 21 and $E_N$ causing the highest density level on the carrier 21, said method comprising the following steps:

arranging all the microdots (22) of the carrier (21) in a periodic pattern of identical tiles (30), represented by one tile;

assigning to each microdot (22) of the tile (30) a pixel tone curve (62 see FIG. 4) for the transformation of the intensity level (60) to the energy level;

generating a specific sequence on the microdots (22) in the tile (30 see FIG. 3)

separating the sequence in at least a first subsequence and a last subsequence assigning to the pixel tone curve (62) of each microdot (22) from the first subsequence energy levels from $E_1$ to $E_N$ in a first range of intensity levels and $E_N$ in a last range of intensity levels assigning to the pixel tone curve of each microdot from the last subsequence the energy levels $E_1$ in said first range of intensity levels and $E_1$ to $E_N$ in the last intensity levels.

BRIEF DESCRIPTION OF THE DRAWINGS

The invention is described hereinafter by way of example with reference to the accompanying figures wherein.

DESCRIPTION OF THE PREFERRED EMBODIMENT

Preferentially the total set of available energy levels (e.g. 64 levels in the Chromapress system) is reduced to a subset of energy levels (e.g. 16 levels in a preferred embodiment) that result in densities for which the variance about the mean density is not larger than the density difference obtained by two consecutive selected energy levels. It is also advantageous to select the energy levels for the subset such that they give equal reflectance decrements, when they are rendered close to a microdot with high density level. Moreover it is advantageous to select a number of energy levels in the subset that is an integer power of two. We have found that the choice of sixteen energy levels has all these advantages. Each of these selected energy levels can get an index number from zero to fifteen. Two of these index numbers can be stored in one byte of eight bits. As such, the energy level information for two microdots can be stored in one byte. If the input image intensity levels are given in 256 levels, requiring one byte per pixel of the input image, the bitmap storing the energy indexes requires half the amount of memory.

Tests have revealed that isolated microdots, surrounded by microdots getting the lowest energy level $E_1$, render a predictable density if they have a quite high energy level or if they are not accompanied with neighbouring microdots having a lower energy level, but higher than $E_1$. Thus, for the reproduction of image regions with low density it is better to render some isolated microdots with a quite high energy level, surrounded by microdots with the lowest energy level $E_1$, than to render more connected microdots with low energy level higher than $E_1$. Theoretically both approaches would give the same average density, averaged over say 10×10 microdots, but practically the reproduction with connected low energy microdots would give unpredictable results.

Once established that in low density regions isolated high energy microdots are a bonus, the location of these high energy microdots must be determined. One possible position allocation scheme is to place these microdots at regular distances from each other, their relative distance being inversely proportional to the square root of intensity level of the image to be reproduced at that location. It can be experimentally shown and theoretically proven that such an arrangement can result in important auto moire patterns. Preferably, the microdots are arranged in a tile. The tile can have any form that can be repeated over the recorder grid to cover fully the carrier. This shape can be a parallelogram with any direction for the basis and the oblique side, a rectangular shape or a square or a combination of two or more rectangles or squares. The method of the current invention was carried out on a tile having a square shape, parallel to the recorder grid and a size of 256 by 256 microdots. Whereas in FIG. 3 and FIG. 4 by way of example a 4×4 tiles are shown. This large size of the tile ensures that no periodic patterns will become apparent in the image on the carrier. For a 600 dpi system this corresponds with about 11 mm. The whole carrier is 21 tiled with these identical tiles, such that every microdot belongs to one tile and has a relative position assigned within this tile. The original image is reduced to the spatial resolution and orientation of the recorder grid or resampled—before or during the halftoning—according to this grid by methods known in the art. The resampling method can be nearest neighbour resampling, also called replication for enlargement or decimation for reduction. The resampling method can also be some form of interpolation, such as bilinear interpolation, cubic convolution or convolution by other kernels—as well interpolating as smoothing kernels—known in the art. As such, for every microdot 22 with address (x,y) on the carrier 21 in FIG. 3, there exists one pixel 29 in the resampled input image, having an intensity level I. The address (x,y) of the microdot can be translated to a relative location (r,s) within the tile to which the microdot belongs. This translation can be done by a simple modulo operation if the tiles are rectangular and parallel to the recorder grid. The intensity level I can typically range from 0 to 255, for an eight bit input image. This intensity level I is given for every microdot and must be mapped to an energy level or an energy level index. The mapping from an intensity level to an energy level index is preferentially done by a look up table 62 in FIG. 4 per microdot 60 in the tile. If the range of intensity levels is from 0 to 255, then each look up table 62 will have 256 entries 63 From each entry 63 an energy level index can be obtained. The assignment of energy level indexes to the look up table entries 63 for each microdot 60 in a tile 61, will constitute the way how a continuous tone input image is transformed to a multilevel halftone image. This kind of look up tables will further be called "pixel tone curve" 62.

It is clear that it is prohibitive to store all the pixel tone curves for a complete tile of 256×256 microdots. This would require space for 65,536 pixel tone curves, with 256 entries each, which corresponds to more than sixteen million entries. Instead, as we will describe further, a lot of these pixel tone curves belong to equivalent microdots. Microdots are equivalent if they have identical pixel tone curves. This means that all entries (256 in our example) have the same energy level indexes. The location of equivalent microdots within a tile has a special arrangement, as will be discussed also later. As such, about 128 different pixel tone curves are sufficient to render images with a high degree of quality. These 128 pixel tone curves can be arranged in an array, each pixel tone curve getting a specific pixel tone curve index p. From the relative location (r,s) within the tile, the pixel tone curve index can be derived via a specific pixel tone curve index look up table, constructed by the method of the current invention, that transforms the relative location (r,s) to a pixel tone curve index p. These pixel tone curves indexes can be arranged such that by sequentially accessing the microdots in the tile, the indexes are found in sequential locations in memory.

The arrangement of equivalent microdots over the tile must be done such as to avoid disturbing patterns. Preferentially, the microdots within the tile are arranged into a random sequence. This random sequence is divided into at least two subsequences. As such there is a first subsequence and a last subsequence. The microdots belonging to the first subsequence are the microdots that will be rendered with a higher density level than the microdots belonging to the other subsequences for the highest intensity levels I of the image. All microdots not belonging to this first subset will get the lowest energy level $E_1$ for these highest intensity levels I. For the highest possible intensity level, none of these microdots belonging to the first set will get an energy level higher than the lowest energy level $E_1$. This means that for the highest intensity level, all microdots will get an energy level $E_1$, leaving the carrier completely at its background density. For intensity levels I slightly lower than the highest intensity level, only the microdots belonging to the first subset will be affected. They will get energy levels slightly higher than $E_1$. This means that the microdots belonging to the first subset will get a density higher than the background density of the carrier. As said before, these microdots with a low energy level are preferentially isolated. This isolation can be achieved by a proper choice of the random sequence. The microdots not belonging to the first set, will still be affected by the lowest energy level $E_1$ for these slightly lower intensity levels. It is obvious that this is reflected in the pixel tone curves 62 of the microdots 60. The microdots belonging to the first set will have in the pixel tone curve entries corresponding to the highest intensity levels, different energy level indexes. The microdots not belonging to the first set will have in the same entries one single energy level index, corresponding with energy level $E_1$.

For still lower intensity levels I, the microdots belonging to the first subset get higher energy levels assigned, which is reflected in the corresponding pixel tone curves, where the energy level indexes keep on changing reflecting increasing energy levels with decreasing intensity levels I. The microdots belonging to the first set are affected with energy levels, that increase fast as a function of descending intensity levels, until for these microdots a stable energy level is reached. A stable energy level is defined here as an energy level that, when applied to isolated microdots (i.e. the neighbouring or surrounding microdots have the lowest energy level applied and are thus not activated) in a repeating pattern so as to cover a large surface, will—after development—result in a density pattern on the hardcopy carrier that does not contain any spurious low frequency variations. The characteristic of a stable energy level is that the juxtaposition of a first microdot, activated with a stable energy level, with a second microdot, activated with an instable energy level, tends to yield a stable pair of microdots. Preferably, the energy level of the microdots belonging to the first subset is raised to the highest selected energy level, before the second phase is started. Thus all high intensity levels affect only the microdots belonging to the first subset. For the lowest intensity level belonging to the high intensity levels, all microdots belonging to the first subset are affected preferentially by the highest energy level. The density averaged over the tile, will correspond now to the lowest intensity of the high range.

Figure 6:
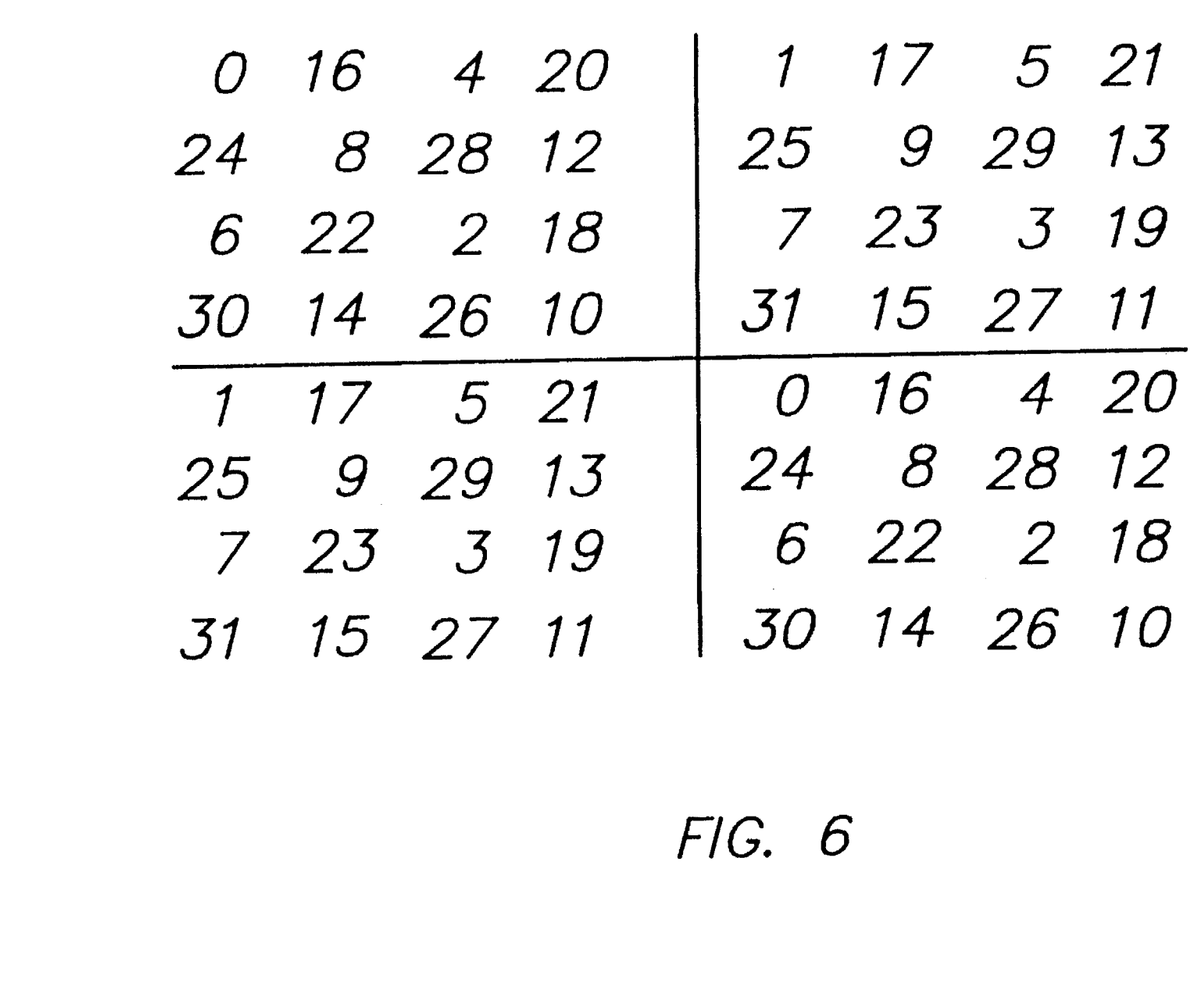
FIG. 6 is graph showing the arrangement of a 4×4 Bayer Matrix along with a 4×8 and an 8×8 Bayer Matrix.
Figure 7:
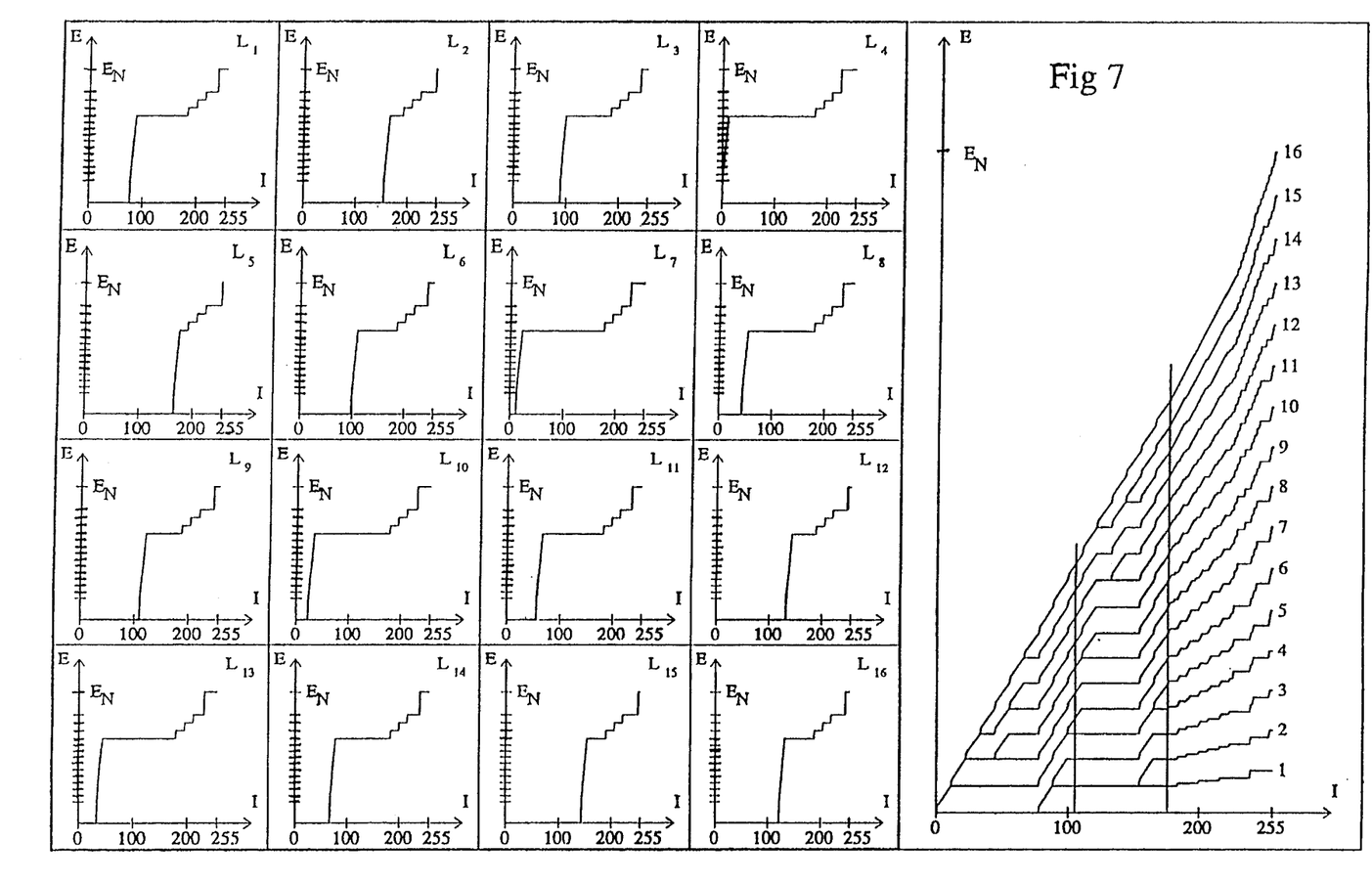
FIG. 7 is a graph showing pixel tone curves $L_1$ to $L_{16}$ for one microdot each and the cumulative energy diagram for 16 microdots in a 4×4 tile.

In a preferred embodiment of the current invention, the random sequence is based on the arrangement of a Bayer matrix as shown in FIG. 6. A Bayer matrix is well known in the art (see e.g. "An optimum method for two-level rendition of continuous-tone pictures" by B. E. Bayer in Proceedings IEEE, International Conference on Communications, Volume 26, pages 11–15, 1973). In this article, this matrix is well defined for a tile with a length and width being an integer power of two. The Bayer matrix on a 256×256 tile of microdots can be thought to give a unique index from 0 to 65,535 to all microdots. In a preferred embodiment, a first fraction of 1/32th part of these microdots is arranged in the first subset. Therefor we take the 2048 microdots with the lowest index i.e. 0–2047 in the Bayer matrix. These microdots are scattered "randomly" over the tile. However, the Bayer matrix is arranged such that in every subtile of 8×8 microdots, there are exactly 2 microdots that belong to the first subset. As such, these 2048 microdots are homogeneously scattered over the tile. The fraction 1/32 is chosen to avoid disturbing frequency patterns in the tile. If a fraction close to 1/32 were chosen, e.g. 2044 microdots, this would give well known artifacts of the Bayer matrix with annoying visual effects on the image. A fraction lower than 1/32, e.g. 1/64, 1/128, etc. could also have been chosen, but the microdots having a marking density would be spaced so far apart from each other, that the spatial resolution of the image reproduction would be reduced too much. Of course, when systems with higher recorder grid resolution are used, these fractions are also good candidates. These 2048 microdots are the only visible microdots, having a density different from the background density of the carrier, for the highest intensity levels. For the chromapress system, this corresponds roughly to the intensity levels from 255 to 248. As soon as these 2048 microdots reached the highest density levels, other microdots must be addressed to reach higher average density levels. Therefore we take a second subset from the—randomised, as we will further discuss—Bayer sequence, such that 1/8 of the microdots belong to the first or second subset. For the current embodiment, the second subset contains 6,144 microdots, having an index in the Bayer matrix ranging from 2,048 to 8,191. The microdots belonging to the first and second subset are—by the choice of the Bayer matrix as a random sequence—equally distributed such that for every 4×4 subtile, exactly two microdots belong to the first or second subset, and will get a density different from the background density accordingly. When the intensity level for the image further decreases—for the Chromapress system typically from intensity level 247 to 224—the energy levels for the microdots belonging to the second set are increased. This means that for this intensity interval (e.g. [247,224]), the entries in the pixel tone curves 62 for microdots belonging to the first subset remain at the same high energy level index, the entries for the second subset point gradually to higher energy levels for decreasing intensities, and the entries for microdots not belonging to the first or second subset still index to the lowest energy level. The intensity range that can be covered by this second subset of microdots is also restricted. As soon as the lowest intensity (e.g. 224) for this range is reached, again other microdots must be selected to get energy levels assigned that change the density of the carrier. This time, we select the third subset such that ¼th of the microdots belong to the first, second or third subset. The microdots belonging to the third subset thus have index 8,192 to 16,383. The arrangement according to the Bayer matrix makes that every 2×2 subtile contains exactly one microdot belonging to the first, second or third set. The ratios ¼ and ⅛ were chosen to avoid disturbing frequencies that tend to appear if ratios close to ¼ or ⅛ are selected. It is not guaranteed that the microdots belonging to the first, second or third subset do not connect. Microdots are said to connect to each other if they touch each other by one side or by a corner. If microdots having an energy level higher than $E_1$ touch each other by one side, this gives very disturbing effects in the reproduced image. This occurs especially for density levels that require that only about a quarter or one eight of the microdots must render a density different than the background density. Such a situation can occur if the Bayer matrix is used as such. Therefore, in a preferred embodiment, the ordering imposed by the Bayer matrix is rearranged before the sequential numbering is started. This is done by a random permutation of every 2×2 submatrix in the Bayer matrix. In every 2×2 submatrix, 4 elements are present. These elements can be rearranged or permuted in 4!=24 different ways. A random generator, generating white noise, is scaled to generate uniformly random numbers from 1 to 24, to select one of these permutations. Each specific 2×2 subtile is rearranged accordingly. For each new 2×2 subtile, another random number from 1 to 24 is generated.

Figure 1:
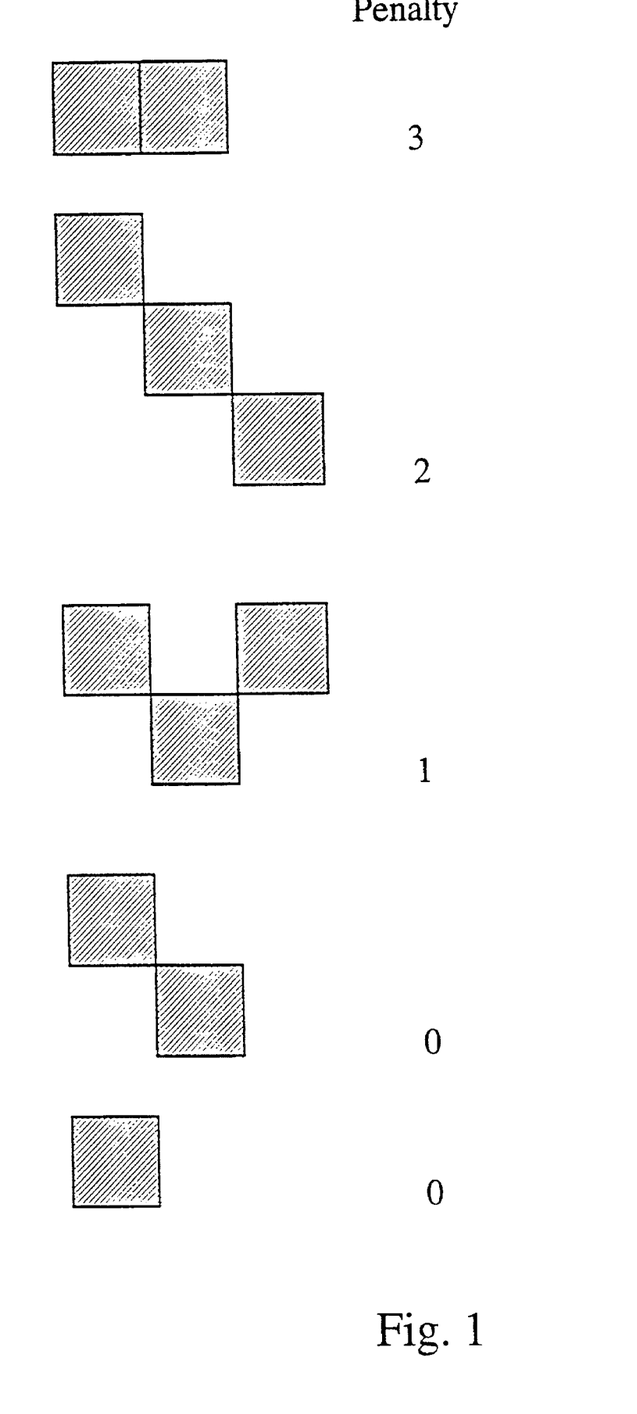
FIG. 1 shows disturbing patterns and their penalty in a randomised Bayer matrix.

By this operation, disturbing patterns as shown in FIG. 1 are induced. The shaded microdots are microdots that belong to the first, second or third subset. The elimination of most of the disturbing patterns is done by a runlength reduction procedure. For this purpose, all these patterns get a penalty number. The more disturbing the pattern, the higher the penalty number assigned. In a process, following the random permutations, the penalty function for each microdot is computed and for each microdot a rearrangement within the 2×2 submatrix to which it belongs is sought to minimise the penalty. The first arrangement shown in FIG. 1 is obtained by two neighbouring microdots that have a common side. This arrangement gets the highest penalty number of 3. In the example shown, the microdots have a common left and right side, but the situation where the common side is the upper and the lower side, gets the same penalty. This configuration must and can in all cases be avoided by replacement of the microdot with lowest sequence number by another one in the 2×2 submatrix. The second arrangement gets a penalty number of 2. Here, three (or more) microdots are connected to each other by one corner, such that they form a diagonal line. The diagonal line can be oriented NW-SE as in FIG. 1, but can also be oriented NE-SW. Also this structure must be avoided. In most of the cases, this structure can be totally avoided over the whole Bayer matrix. The next possible disturbing structure is shown in FIG. 1 with penalty number 1. This structure is still disturbing but is preferred above the structures with penalty number 2 and 3. Three microdots are connected to each other by their corner points, but the three microdots do not form a line. For this situation there are other orientations possible, which can be obtained by rotation of the structure over multiples of 90°. Although there are other more favourite structures, it is not possible to avoid this type of structure from the Bayer matrix. The next situation is obtained by exactly two microdots of which the corner points touch each other. This is a situation that gets a penalty number of 0. If this arrangement occurs, nothing is done to transform it to another arrangement. The last situation is the one being clearly the most optimal, where the microdot is isolated from its neighbours. It gets also penalty number 0. Nothing must be done to avoid this situation.

For the runlength reduction procedure based on the described penalty numbers, the 2×2 submatrices within the Bayer matrix are visited sequentially, for example from left to right and from top to bottom. For each possible location within the 2×2 submatrix of the microdot with the lowest sequence number, the penalty function is evaluated as a sum of the penalties for the arrangements shown in FIG. 1. The location that corresponds with the lowest summed penalty is selected as the location for the microdot with the lowest sequence number within the specific 2×2 Bayer matrix. Rearrangements of microdots are never performed on microdots that were handled in a previous stage. This means that the location of the microdots above the current line and at the left side of the current microdot remains fixed.

Although this rearrangement is described here, the rearrangement is done before the operations on the first subsequence are started. The effect of these operations becomes apparent when one fourth of the microdots are affected, and that is the reason why the discussion was postponed to this stage. But the microdots belonging to the first and second subsequence must be positioned such that by addition of the microdots belonging to the third subsequence no disturbing patterns occur.

As in the previous subsets, the microdots belonging to the third subset will have an intensity interval—for the Chromapress system approximately from intensity level 223 to 192—for which the energy levels grow from the lowest possible $E_1$ to an energy level giving stable microdots or to the highest energy level. The three quarters of the microdots not belonging to the first three subsequences will have their pixel tone curves also for these intensity level entries I indexing to the lowest energy level $E_1$.

For the next input image intensity level interval, other microdots—not belonging to the first three subsets—must be selected to get an energy level above $E_1$. Therefore, in each 2×2 submatrix one candidate microdot is sought. This time, the candidate microdot must have one side common to the microdot belonging to one of the previous three subsequences, called here the previous microdot. If the previous microdot is located in the top-left position of the submatrix, then the candidate can be either the top-right or bottom-left microdot within the same 2×2 submatrix. The choice is made at random. If the previous microdot is located on the top-right or bottom-left position of the 2×2 submatrix, then the only candidate is located at the top-left position. If the previous microdot is located at the bottom-right position, then back again a choice can randomly be made between the bottom-left and the top-right position. These candidates form the fourth set of microdots, and get also an intensity interval assigned—for the Chromapress system approximately from intensity level 191 to 163—for which only their entries in the pixel tone curves change the energy level index. The microdots belonging to the fourth set however do not get all energy levels assigned up to the maximum energy level. It is advantageous to raise the energy levels for these microdots to an intermediate energy level and then starting to affect the remaining microdots, forming the fifth and last subsequence. From the moment that the microdots belonging to the fourth set have reached the intermediate level—corresponding approximately to an intensity level of 163 on the Chromapress system—then all 2×2 submatrices have one microdot at maximum energy level, one microdot at intermediate energy level and two microdots at lowest energy level. From this moment, a decrement of input image intensity level is realised by an increment in energy level for the microdot in the 2×2 submatrix having the lowest energy level. This way, the contone capabilities of the rendering device are optimally used, at the highest possible spatial resolution. For the last intensity level interval, all microdots belonging to the fourth and fifth subsequence have a pixel tone curve with entries that point to higher energy levels when the intensity level decreases. The pixel tone curves of the microdots belonging to the first, second and third subsequence have entries pointing to the highest energy levels for all these intensity levels. If the process for the assignment of higher energy levels were stopped as soon as the stable energy levels were reached, then the energy levels for the microdots belonging to the first three subsequences would further increase, as soon as all the microdots of the 2×2 submatrix reached the stable energy level.

We have sketched above five subsequences. If all microdots belonging to the same subsequence would be treated in exactly the same way, then five different pixel tone curves would result, and all microdots belonging to one subsequence would be equivalent, having exactly the same pixel tone curve. This can result in different intensity levels that have to be mapped to exactly the same energy level distribution over the tile, resulting in contouring problems. It is advantageous to impose a differentiation on the equivalent microdots. This is preferentially done as follows. Again a Bayer matrix as shown in FIG. 6 is generated over the tile. Another randomisation can be superimposed on this Bayer matrix, by permutation of the microdots within 2×2 submatrix positions. For every new intensity level, a set of candidates of microdots exist for energy level increment. For the highest intensity levels, the set is formed by the microdots belonging to the first subsequence only, for lower intensity levels, the set is exclusively formed by microdots belonging to the second subsequence, for even lower intensity levels, the set is exclusively formed by the microdots belonging to the third subsequence, then the microdots belonging to the fourth subsequence and for lower intensity levels, the set of candidates of microdots is formed by the fourth and fifth subsequence. If all these candidates get the same energy level change, the average density level would increase too much. Therefore, a subset must be selected that gets an energy level increment for an intensity level decrement. This subset is selected on the basis of the second re-ordered Bayer matrix superimposed on the tile. From the candidates that can get an energy level increment, those are selected with the lowest microdot index according to the second re-ordered Bayer sequence. The amount of candidates selected depends on the density increment required for the given intensity level drop. That amount of candidates is preferentially selected such that the same amount of intensity level drop gives the same amount of average reflectance drop, averaged over the whole tile. The differentiation of the equivalent microdots can be restricted by the desired maximum amount of different pixel tone curves. We have found that 128 different pixel tone curves for a 256×256 tile give results that can be compared with halftoning obtained by complex error diffusion methods, such as a randomised binary error diffusion algorithm, available from PhotoShop 2.5 (PhotoShop is a trademark of Adobe Inc). Moreover, halftoning by use of repetitive screen tiles has important advantages over error diffusion techniques: they can be implemented in software to be more performant and are easier to be implemented in hardware.

The method described above uses a kind of frequency modulation for the highest intensity levels, where the evenly distributed isolated microdots are raised to a stable energy level, before new isolated microdots are added. From the moment that about one fourth of the intensity levels have been covered by a partially bilevel frequency modulation technique, the other intensity levels are covered by a contone modulation technique, that better preserves the spatial resolution than the frequency modulated halftoning. As soon as the frequency modulation requires microdots close to each other, the microdots having a high energy level, influence microdots having the lowest energy level and the last type of microdots can advantageously get higher energy levels.

Figure 2:
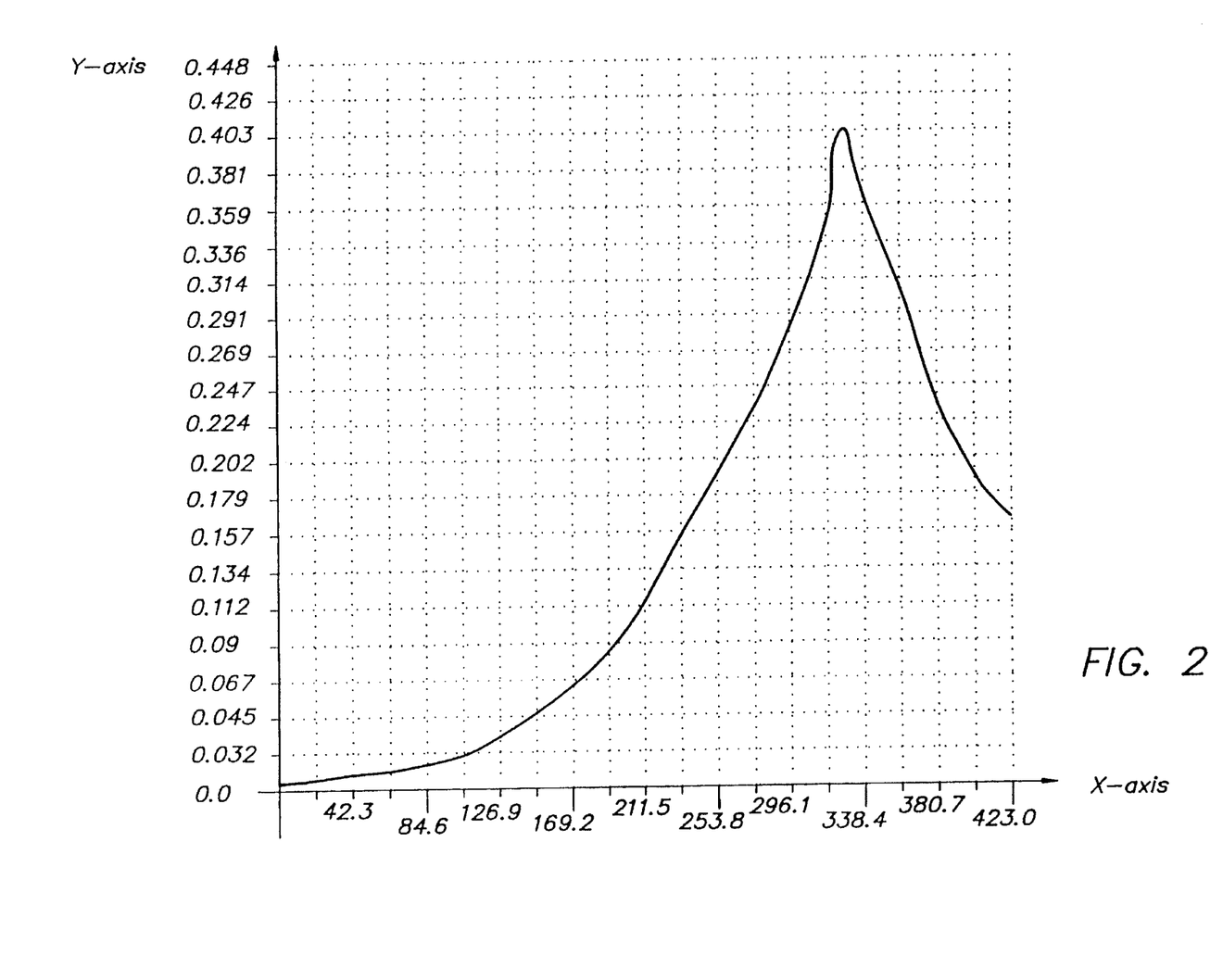
FIG. 2 is a graph showing the radially averaged frequency contents of the density distribution in a tile for a specific intensity level.

Once the pixel tone curves for all microdots 22 of a tile 30 are composed, a full tile or a periodic repetition of the same tile can be rendered on the carrier 21, for one specific intensity level. The frequency contents can now be measured or visually assessed. If low frequencies below 150 lpi are not noticeable, then no disturbing patterns will appear in a real image. The frequency contents for a tile imaged at a specific intensity level can also be analyzed by a computer experiment. For a specific intensity level, the energy level values over a whole tile are computed. For a tile having 256×256 microdots, this gives a matrix of 256 rows by 256 columns. To find the frequency contents, this matrix is transformed to the Fourier domain, by a two-dimensional Fourier transform. The result is again a 256×256 matrix of complex values. The transform is rearranged such that the (real) De-value is centered in the transformed matrix. For each complex value, the phase is omitted, and the amplitude is kept in the matrix. Along concentric circles, the amplitude is averaged, such that a graph as shown in FIG. 2 can be drawn, giving a (circular averaged) frequency spectrum amplitude as a function of the frequency. The shape of these curves is typical for the quality obtained by the method. If at low frequencies large amplitudes or amplitude peaks are visible, then the quality of the reproduction is poor. We have observed that the application of the method described above results in curves that have a low amplitude in low frequency regions. This behaviour is mainly obtained by the rearrangements based on the penalty function as described above.

Although the present invention has been described with reference to preferred embodiments, those skilled in the art will recognise that changes may be made in form and detail without departing from the spirit and scope of the invention.

I claim:

1. A method for the reproduction on a carrier by a rendering system of a continuous tone image represented by intensity levels, wherein the rendering system generates a density change on a microdot on the carrier in response of an energy level $E_j$, $E_1$ causing the lowest density level on the carrier and $E_N$ causing the highest density level on the carrier, said method comprising the following steps:

arranging all the microdots of the carrier in a periodic pattern of identical tiles, represented by one tile;

assigning to each microdot of the tile a pixel tone curve for the transformation of intensity levels to energy levels;

generating a specific sequence for the microdots in the tile;

separating the sequence in at least a first subsequence and a last subsequence;

assigning to the pixel tone curve of each microdot from the first subsequence energy levels from $E_1$ to $E_N$ in a first range of intensity levels and $E_N$ in a last range of intensity levels;

assigning to the pixel tone curve of each microdot from the last subsequence the energy levels $E_1$ in said first range of intensity levels and $E_1$ to $E_N$ in said last range of intensity levels.

2. The method of claim 1, wherein the step of generating the specific sequence comprises the following steps:

generating a sequence according to the Bayer matrix;

rearranging the sequence numbers of at least one submatrix of the Bayer matrix in a random order to obtain a randomised Bayer matrix.

3. The method of claim 2 wherein the step of generating the specific sequence further comprises the following steps:

searching for disturbing patterns in the randomised Bayer matrix, formed by at least two submatrices;

rearranging at least one submatrix to eliminate the disturbing structure.

4. The method according to claim 1, further comprising a second and a third subsequence, wherein:

the first subsequence comprises at least 1/32th of the microdots within the tile;

the second subsequence comprises at least 3/32th of the microdots within the tile;

the third subsequence comprises at least 1/8th of the microdots within the tile;

the energy levels for the second subsequence are varied exclusively in a second range of intensity levels;

the energy levels for the third subsequence are varied exclusively in a third range of intensity levels.

5. The method of claim 4, further comprising the step of differentiating the pixel tone curves of microdots belonging to one subsequence by assigning energy level increments to different input level locations, based on a global ordering superimposed on the tile.

6. The method of claim 5, wherein the global ordering is according to a Bayer matrix or a randomised Bayer matrix.

7. A method for conversion of a continuous tone image to a halftone reproduction on a recorder grid comprising microdots which may take a minimum density level, a maximum density level and at least one intermediate density level wherein:

for high image intensity levels a frequency modulation method is used until the modulation frequency approaches the recorder grid frequency, at which isolated microdots are rendered with maximum density level and other microdots are rendered with minimum density level;

for lower image intensities, for each microdot having a maximum density, one adjacent micro or is selected for getting a density higher than minimum density;

for the lowest image intensities, for each microdot having maximum density, two neighbouring microdots get equal densities or densities having a minimal density difference.

\* \* \* \* \*